United States Patent
Liu (10) Patent No.: US 9,367,769 B2
(45) Date of Patent: Jun. 14, 2016

(54) DEVICE, METHOD FOR IMAGE ANALYSIS AND COMPUTER-READABLE MEDIUM

(71) Applicant: VIVOTEK INC., New Taipei (TW)

(72) Inventor: Cheng-Chieh Liu, New Taipei (TW)

(73) Assignee: VIVOTEK INC., NEW TAIPEI (TW)

( * ) Notice: Subject to any disclaimer, the term of this patent is extended or adjusted under 35 U.S.C. 154(b) by 0 days.

(21) Appl. No.: 14/661,610

(22) Filed: Mar. 18, 2015

(65) Prior Publication Data

US 2015/0269731 A1    Sep. 24, 2015

(30) Foreign Application Priority Data

Mar. 19, 2014   (TW) .............................. 103110376 A (51) Int. Cl.
  *G06K 9/00*   (2006.01)
  *G06K 9/68*   (2006.01)
  *G06K 9/32*   (2006.01)

(52) U.S. Cl.
  CPC ............ *G06K 9/6857* (2013.01); *G06K 9/3258* (2013.01); *G06K 2209/15* (2013.01)

(58) Field of Classification Search
  None
  See application file for complete search history.

(56) References Cited

U.S. PATENT DOCUMENTS

2013/0141597 A1*   6/2013   Lee .................... H04N 5/23219
                                                              348/207.11

\* cited by examiner

*Primary Examiner* — Atiba O Fitzpatrick
(74) *Attorney, Agent, or Firm* — Locke Lord LLP; Tim Tingkang Xia, Esq.

(57) ABSTRACT

A device, method for image analysis and a computer-readable medium are provided. The method includes loading a first video stream having a first resolution, and selecting one first video frame of the first video stream. When an object exists in the selected first video frame, determine whether an image of the object in the selected first video frame matches a preset condition. If yes, the method performs image analysis to the image of the object in the selected first video frame. If not, the method loads a second video stream having a second resolution higher than the first resolution, selects one second video frame of the second video stream that the object exists in it, and performs the image analysis to an image of the object in the selected second video frame.

18 Claims, 7 Drawing Sheets

DEVICE, METHOD FOR IMAGE ANALYSIS AND COMPUTER-READABLE MEDIUM

CROSS-REFERENCE TO RELATED APPLICATIONS

This non-provisional application claims priority under 35 U.S.C. §119(a) on Patent Application No(s). 103110376 filed in Taiwan, R.O.C. on Mar. 19, 2014, the entire contents of which are hereby incorporated by reference.

TECHNICAL FIELD

The disclosure relates to an image analysis device, more particularly to a device and method for image analysis and a computer-readable medium thereof, which is capable of selectively loading various resolution video streams to analyze images.

BACKGROUND

Because of the enhancement of image processing performance of image processor, video devices (e.g. IP cameras) installed in dwellings, workplaces or vehicles have been able to simultaneously produce multiple video streams under various resolutions. For example, the video device provides a mobile device with a video stream under a lower resolution as providing a surveillance system with a video stream under a higher resolution. For example, if the video device provides a surveillance system with a video stream under a high resolution, the surveillance system will store video frames of the video stream of the high resolution in a storage media. Therefore, if a certain dispute event or serious accident occurs one day, it needs a clear image for a computing device (e.g. a central computing unit (CPU)) to perform image analysis to recognize the image of a target and clarify the real situation or identify a certain person.

On the other hand, more and more computer vision technologies are applied to real-time or later image analysis, so as to mitigate users' loading. However, when intending to recognize an object appearing in video frames under a high resolution, a computing device needs to spend more time in processing these video frames in order to efficiently recognize the object. For example, processing video frames includes decompressing and then analyzing them. The higher the resolution of a video stream is, the heavier the computation for the decompression and image analysis of video frames is. Therefore, if a surveillance system that multiple IP cameras link to through networks, intends to analyze and recognize an object in a great deal of high-resolution images, a computing device in the surveillance system will be subjected to more heavy load.

SUMMARY

According to one or more embodiments, the disclosure provides an image analysis method. In one embodiment, the image analysis method includes the following steps. Load a first video stream having a first resolution. Select one of first video frames of the first video stream. Determine whether an object exists in the selected first video frame. When the object exists in the selected first video frame, determine whether an image of the object in the selected first video frame matches a preset condition. When the image of the object matches the preset condition, perform image analysis to the image of the object in the selected first video frame. When the image of the object in the selected first video frame does not match the preset condition, load a second video stream that has a second resolution that is higher than the first resolution, select at least one of second video frames of the second video stream which the object exists in, and perform the image analysis to an image of the object in the at least one selected second video frame.

According to one or more embodiments, the disclosure provides an image analysis device. In one embodiment, the image analysis device includes a video stream receiving module and a processing module. The video stream receiving module loads a first video stream having a first resolution. The processing module coupled with the video stream receiving module selects one of first video frames of the first video stream and determines whether an object exists in the selected first video frame. When the object exists in the selected first video frame, the processing module determines whether an image of the object in the selected first video frame matches a preset condition. When the image of the object in the selected first video frame matches the preset condition, the processing module performs image analysis to the image of the object in the selected first video frame. When the image of the object in the selected first video frame does not match the preset condition, the video stream receiving module loads a second video stream having a second resolution larger than the first resolution and the processing module selects at least one of second video frames of the second video stream which the object exists in, and performs the image analysis to an image of the object in the at least one selected second video frame.

According to one or more embodiments, the disclosure provides a computer-readable media. In one embodiment, the computer-readable media includes a computer program for controlling the processing module to execute a plurality of instructions including the image analysis method aforementioned.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
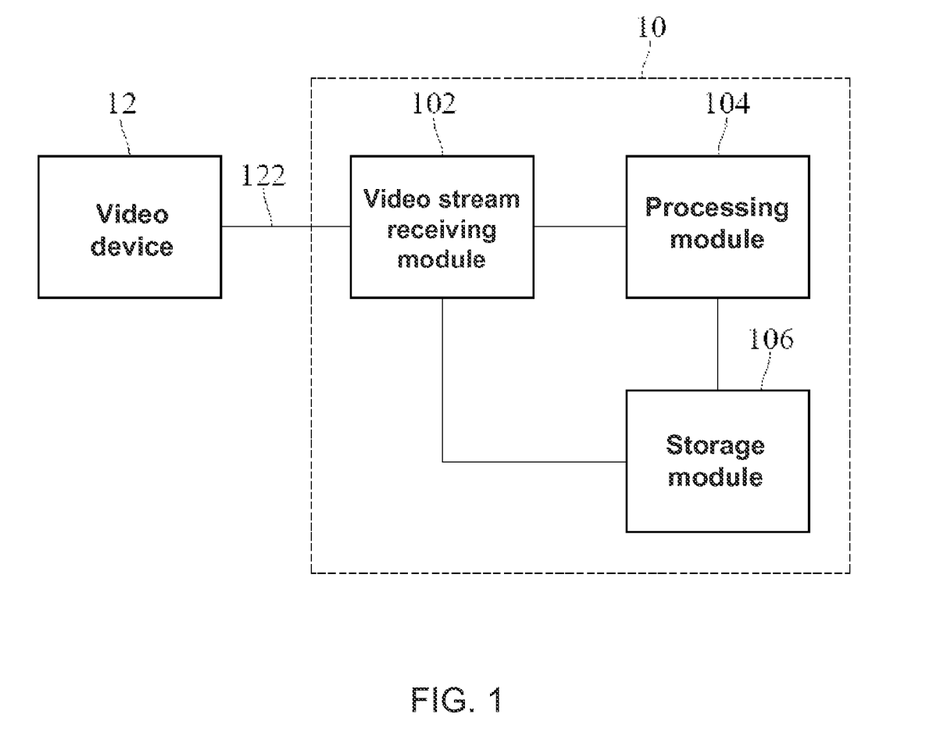
FIG. 1 is a functional block diagram of an image analysis device according to an embodiment of the disclosure.

FIG. 1 is a functional block diagram of an image analysis device according to an embodiment of the disclosure. An image analysis device 10 includes a video stream receiving module 102, a processing module 104, and a storage module 106. The video stream receiving module 102 is coupled with a video device 12 and the processing module 104.

Figure 2:
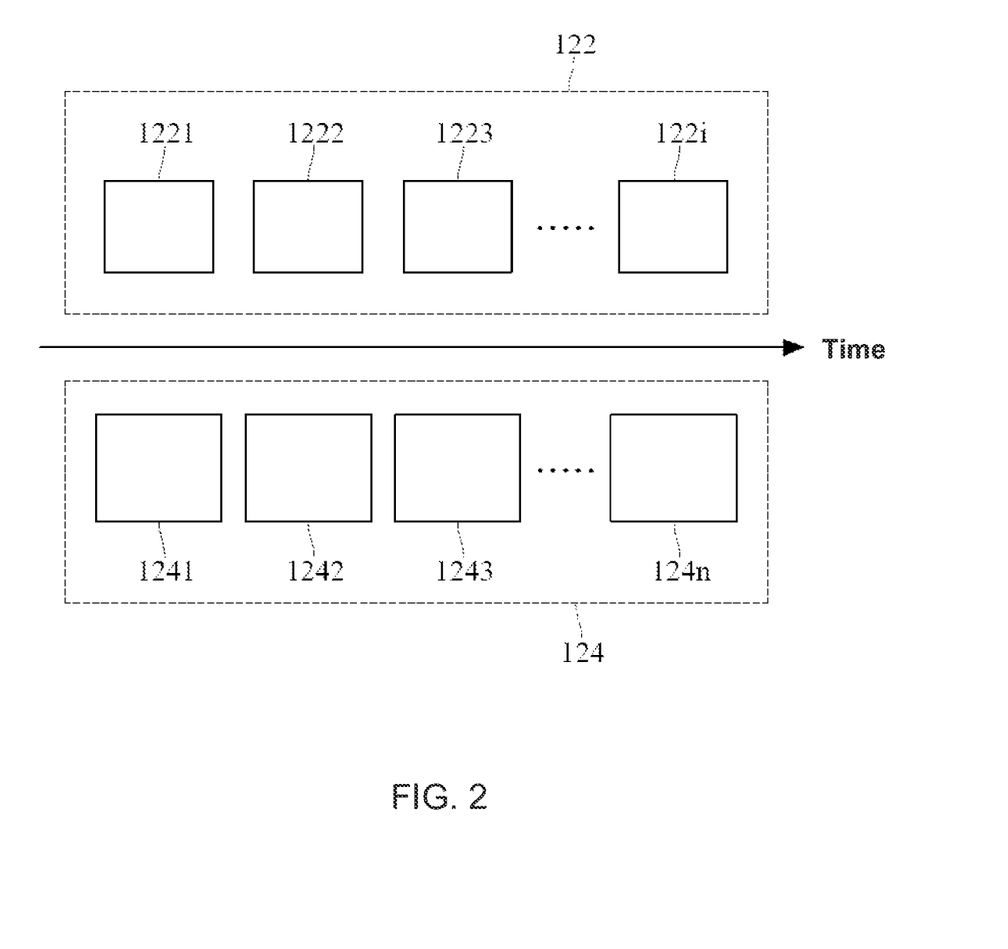
FIG. 2 is a schematic diagram of a first video stream and a second video stream according to an embodiment of the disclosure.

The video stream receiving module 102 loads video streams as shown in FIG. 2. FIG. 2 is a schematic diagram of a first video stream and a second video stream according to an embodiment of the disclosure. In an exemplary embodiment, the video stream receiving module 102 loads a first video stream 122 having a first resolution. After the video device 12 captures first video frames 1221, 1222 and 1223 to 122$i$ during a period of time, the video device 12 compresses these first video frames 1221, 1222 and 1223 to 122$i$ into the first video stream 122 and then sends the first video stream 122 to the video stream receiving module 102. After the video stream receiving module 102 loads the first video stream 122, the video stream receiving module 102 decompresses the first video stream 122 to obtain the first video frames 1221, 1222 and 1223 to 122$i$ for the image analysis. The first video frames 1221, 1222 and 1223 to 122$i$ of the first video stream 122 have the first resolution. For example, the video device 12 is a video camera, an IP camera, or any suitable device capable of capturing images or storing images.

Figure 3:
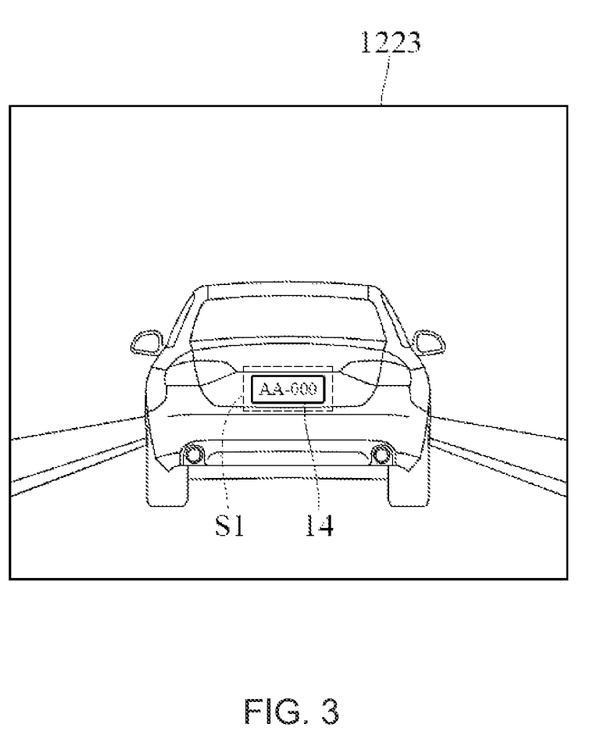
FIG. 3 is a schematic diagram of the content of a first video frame according to an embodiment of the disclosure.

The processing module 104 selects one of the first video frames 1221, 1222 and 1223 to 122$i$ of the first video stream 122 and determines whether the selected first video frame shows an object 14 that is preset. When the video stream receiving module 102 receives the first video stream 122 having the first resolution from the video device 12, the video stream receiving module 102 decompresses the first video stream 122 into the first video frames 1221, 1222 and 1223 to 122$i$. Then, the video stream receiving module 102 sends at least one of the first video frames 1221, 1222 and 1223 to 122$i$ to the processing module 104. In an exemplary embodiment, the processing module 104 selects the first video frame 1221 that has the first priority in the first video frames 1221, 1222 and 1223 to 122$i$. The content of the first video frame 1221 is shown in FIG. 3, which is a schematic diagram of the content of a first video frame according to an embodiment of the disclosure. Then, the processing module 104 determines whether the object 14 that a user intends to search for exists in the first video frame 1221. In this embodiment, the object 14 is a vehicle registration plate, but the disclosure will not be limited to this embodiment related to the object 14.

In an exemplary embodiment, if the first video frame 1221 does not show the object 14, the processing module 104 selects the first video frame 1222 that has the second priority in the first video frames 1221, 1222 and 1223 to 122$i$, but the disclosure will not be limited to this selection order. In another exemplary embodiment, the processing module 104 can randomly select next one (e.g. the first video frame 1223) of the first video frames 1221, 1222 and 1223 to 122$i$ and then determine whether the object 14 exists in the randomly-selected first video frame. The processing module 104 will repeat the selection and determination of next one first video frame until the first video frame which the object 14 exists in is founded out. For example, the processing module 104 is a microprocessor, a central processing unit (CPU), a graphics processing unit, or any suitable computing component, and the disclosure will not be limited to the type of the processing module 104.

In an exemplary embodiment, if finding out the first video frame 1223 which the object 14 exits in, the processing module 104 determines whether the image of the object 14 in the first video frame 1223 matches a preset condition. When the image of the object 14 in the first video frame 1223 matches the preset condition, the processing module 104 directly performs image analysis to the image of the object 14 in the first video frame 1223. For example, after the processing module 104 knows that the first video frame 1223 shows a vehicle registration plate, the processing module 104 determines whether the image of the vehicle registration plate matches the preset condition under which the vehicle registration plate can be shown in the first video frame 1223 clearly and be recognized correctly. When the vehicle registration plate shown in the first video frame 1223 is clear enough to be recognized, the processing module 104 directly analyzes the image of the vehicle registration plate to carry out the recognition of the vehicle registration plate and obtain the recognition result related to the vehicle registration plate.

In an embodiment, the image recognition is to recognize the category of the object 14 such as human being or physical thing. In another embodiment, the image recognition is to confirm the object 14, such as to confirm whether the registration identifier of a vehicle registration plate is recorded in a list that a user owns. In another embodiment, the image recognition is to recognize a human face. The image recognition of the object 14 can be any possible applications.

Figure 4:
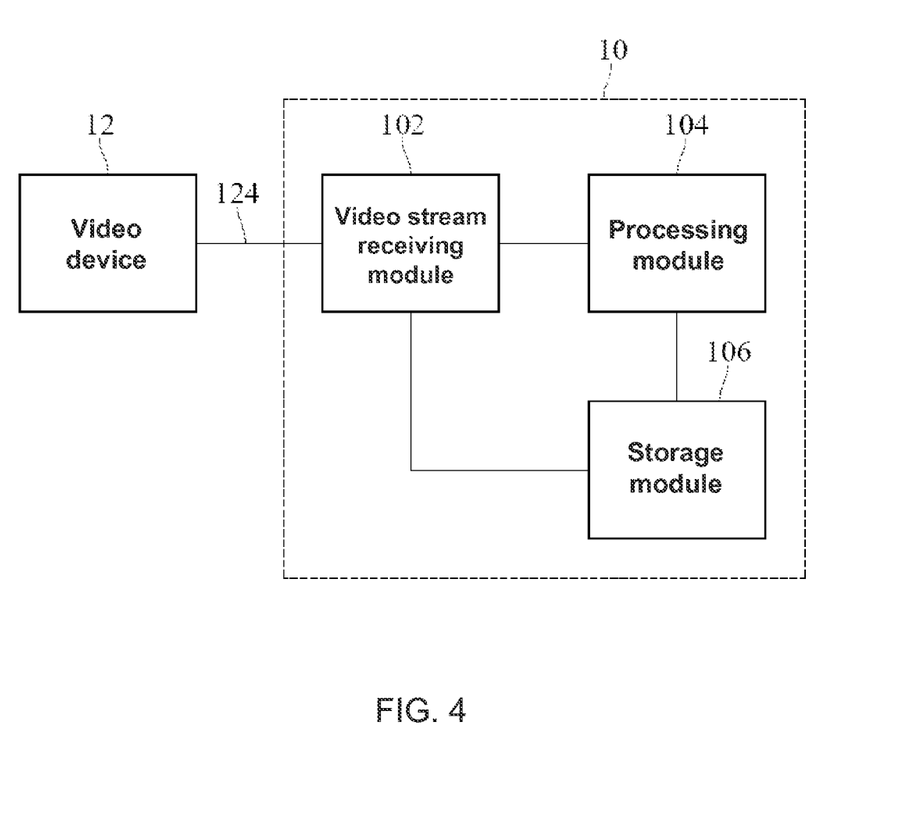
FIG. 4 is a functional block diagram of an image analysis device according to another embodiment of the disclosure.
Figure 5:
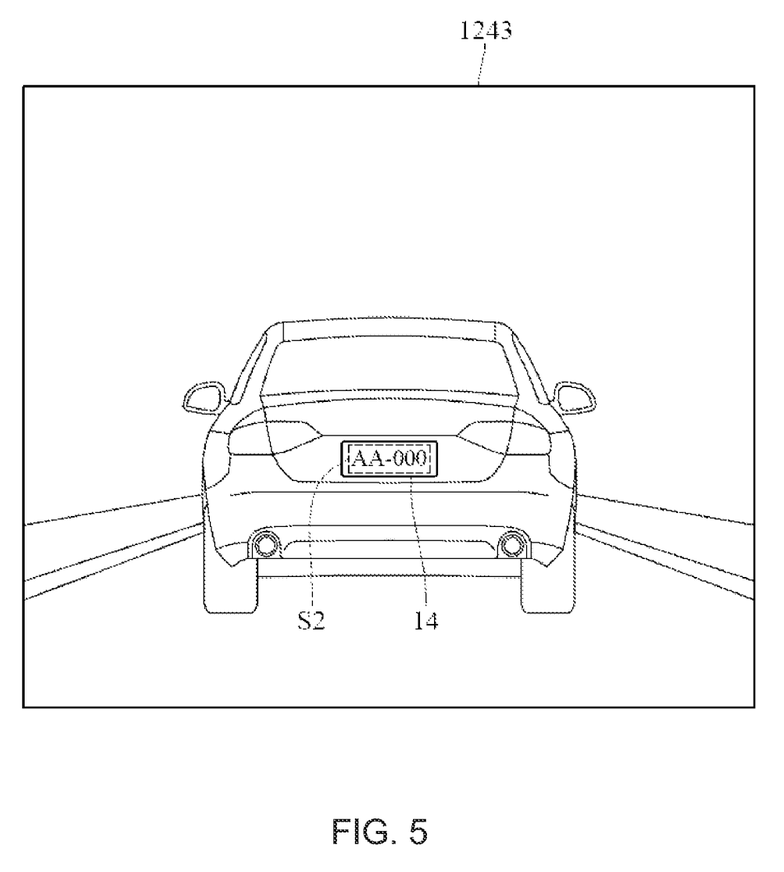
FIG. 5 is a schematic diagram of the content of a second video frame according to an embodiment of the disclosure.

On the other hand, when the image of the object 14 does not match the preset condition, the video stream receiving module 102 loads the second video stream 124 having a second resolution greater than the first resolution of the first video stream 122, as shown in FIG. 4, which is a functional block diagram of an image analysis device according to another embodiment of the disclosure. A second video frame of the second video stream 124 is shown in FIG. 5, which is a schematic diagram of the content of a second video frame according to an embodiment of the disclosure.

To clearly describe the image recognition of the object 14, the following embodiments of the object 14 uses a vehicle registration plate.

In practice, when the image of the vehicle registration plate in a video frame under a low resolution satisfies a preset condition, the vehicle registration plate can be recognized correctly. For example, if the processing module 104 intends to correctly recognize a vehicle registration plate shown in the first video frame 1223 under a low resolution, the area of the image of the vehicle registration plate in the first video frame 1223 under the low resolution needs to be large enough. For example, the preset condition requires that the area of the image of the vehicle registration plate is 3 pixels per centimeter (cm) in relation to the area of the video frame. Therefore, the numeric or alphanumeric code, i.e. the registration identifier, of the vehicle registration plate can be recognized correctly. The above one or more examples for the area of the image of the object 14 are used for illustrating the example of preset condition but do not limit the disclosure. The actual area of the image of the object 14 is defined according to the area and resolution of the video frame. If the processing module 104 considers that the object 14 cannot be recognized in the video frame of a low resolution (i.e. the first resolution) correctly, the processing module 104 will use another video stream of a higher resolution (i.e. the second resolution) instead of the video stream of the low resolution to perform the recognition of the object 14. Therefore, the disclosure allows the object 14 under any condition (e.g. any image area) to be recognized correctly.

Then, the processing module 104 selects at least one second video frame which the object 14 exists in, from the second video frames 1241, 1242 and 1243 to 124$n$ of the second video stream 124. For example, the processing module 104 selects the second video frame 1243. Also, the processing module 104 performs image analysis to the image of the object 14 in the second video frame 1243. In an exemplary embodiment, the first resolution of the first video stream 122 is 320×240 pixels, and if the image of the vehicle registration plate does not match a preset condition under which the vehicle registration plate shown in the first video frame 1223 of 320×240 pixels can be recognized correctly, the processing module 104 commands the video stream receiving module 102 to receive the second video stream 124. Then, the video stream receiving module 102 loads the second video stream 124 having a higher resolution, e.g. 640×480 pixels, provided by the video device 12 and decompresses the second video stream 124 to obtain the second video frames 1241, 1242 and 1243 to 124n having the resolution of 640×480 pixels. The processing module 104 selects at least one second video frame which the object 14 exists in, e.g. the vehicle registration plate, from the second video frames 1241, 1242 and 1243 to 124n. For example, the processing module 104 selects the second video frame 1243 which the object 14 exists in. Also, the processing module 104 determines whether the image of the vehicle registration plate in the second video frame 1243 matches a preset condition related to the second resolution. When the image of the object 14 in the second video frame 1243 matches the preset condition related to the second resolution, the processing module 104 performs image analysis to the image of the object 14 in the second video frame 1243. Therefore, it is carried out to redeem the failure in the image recognition of the first video frame 1223 against the object 14 under the first resolution.

In an exemplary embodiment, the preset condition is that the area of the image of the object 14 in the first video frame 1223 selected is larger than a threshold S1, and that the area of the image of the object 14 in the second video frame 1243 selected is larger than a threshold S2. For example, the processing module 104 will consider that the image of the image of the vehicle registration plate in the first video frame 1223 matches the preset condition if the area of the image of the vehicle registration plate in the first video frame 1223 is larger than the threshold S1, e.g. the minimum area, which lets the vehicle registration plate clearly be recognized in the selected first video frame 1223. For example, the image of the vehicle registration plate in the first video frame 1223 has 1 pixel per centimeter in relation to the area of the selected first video frame 1223, and if the threshold S1 to clearly recognize the vehicle registration plate under the first resolution of 320×240 pixels is 3 pixels per centimeter, the processing module 104 will consider that the vehicle registration plate cannot be recognized in the first video frame 1223 correctly. The processing module 104 then sends the video stream receiving module 102 an instruction to load the second video stream 124. Upon receiving the command, the video stream receiving module 102 loads the second video stream 124 having a second resolution higher than the first resolution of 640×480 pixels from the video device 12. Since the threshold S2 to clearly recognize the vehicle registration plate shown in the second video stream 124 is 3 pixels per centimeter, the processing module 104 considers that the vehicle registration plate shown in the second video frame 1243 can be recognized clearly, and then proceeds to perform the image analysis to the image of the vehicle registration plate.

Moreover, the processing module 104 selects the second resolution of the second video stream 124 according to the difference between the area of the image of the object 14 and the threshold S1. In an exemplary embodiment, the image of the vehicle registration plate in the first video frame 1223 has 1 pixel per centimeter in relation to the area of the first video frame 1223, and if the threshold S1 is 3 pixels per centimeter, the processing module 104 not only considers that the vehicle registration plate shown in the first video frame 1223 cannot be recognized clearly, but also determines the difference between the area of the image of the vehicle registration plate in the first video frame 1223 and the threshold S1. According to such difference, the processing module 104 can decide a resolution that the second video stream 124 to be loaded by the video stream receiving module 102 shall have, so that the vehicle registration plate shown in the second video stream 124 can be recognized correctly. Since the area of the image of the vehicle registration plate in the first video frame 1223 is 1 pixel per centimeter in relation to the area of the first video frame 1223 and is close to the threshold S1 of 3 pixels per centimeter, the processing module 104 will select a second video stream having a resolution of 640×480 pixels to recognize the vehicle registration plate.

In another exemplary embodiment, the area of the image of the vehicle registration plate in the first video frame 1223 has 0.5 pixel per centimeter, and the threshold S1 is 3 pixels per centimeter. Since the difference between the area of the image of the vehicle registration plate and the threshold S1 in this exemplary embodiment is greater than that in the previous exemplary embodiment, the processing module 104 selects the second video stream 124 having a resolution of 1920× 1080 pixels for recognizing the vehicle registration plate.

The disclosure will have no limitation on the selection of the second resolution of the second video stream 124 according to the difference between the area of the object 14 and the threshold S1. In an exemplary embodiment, the area of the image of the object 14 in the first video frame 1223 is much less than the threshold S1, the processing module 104 estimates a resolution for the second video stream 124 in order to correctly recognize the object 14. Upon the estimation of the resolution for the second video stream 124, the processing module 104 requires the video device 12 to send the second video stream 124 having the estimated resolution and recognizes the object 14 shown in the second video stream 124. In another exemplary embodiment, there are more than 2 video streams, and the video stream receiving module 102 can select which video stream having a resolution corresponding to the difference between the area of the image of the object 14 and the threshold Si should be loaded for the image recognition. Therefore, it may save the time to replace one video stream by another for the image recognition when the resolution of video stream is not high enough to correctly recognize the object 14. Moreover, it may save the time to recognize the object 14 by using the video stream of the maximum resolution directly loaded without the estimation of resolution, since the decompression of high-resolution images spends a lot of time.

In an embodiment, the processing module 104 stores an association table reciting the relationship between the resolutions of video stream and the thresholds for different objects. For example, while the processing module 104 intends to recognize the vehicle registration plate shown in the first video frame 1223, the threshold S1 is 5 pixels per centimeter. For example, if the object 14 shown in the first video frame 1223 is the shape of a vehicle, because the shape of the vehicle (e.g. the shape of a sedan, a multi-purpose vehicle or a truck) is easier to be recognized than the characteristic of a vehicle registration plate (e.g. the registration identifier of the vehicle registration plate that is "AA-000"), the processing module 104 can select the threshold S1 of 3 pixels per centimeter for the first video frame 1223. For example, if recognizing the color (for example, red, blue or black) of the object 14 shown in the first video frame 1223, the processing module 104 selects an lower threshold S1 of 1.5 pixels per centimeter to clearly recognize the color of the vehicle.

To speed up the searching of the second video frame which the object 14 shown in the first video frame exists in, the processing module 104 selects the second video frame (e.g. the second video frame 1243) having a timestamp corresponding to a timestamp of the selected first video frame (e.g. the first video frame 1223) and performs the image analysis to the selected second video frame. In other words, while the processing module 104 intends to search for the second video frame 1243 showing the vehicle registration plate, the processing module 104 can select the second video frame 1243 having a timestamp the same as or similar to the timestamp of the first video frame 1223 and can determine whether the image of the vehicle registration plate in the second video frame 1243 matches a preset condition. Therefore, the time to search for which second video frame in the second video stream 124 appears the object 14 can be saved when the second video stream 124 instead of the first video stream 122 is applied to the recognition of the object 14 because the area of the object 14 shown in the first video frame 1223 of the first video stream 122 is too small to make the object 14 be recognized correctly.

For example, the processing module 104 finds out the first video frame 1223 having a timestamp of "2014 Jan. 1 T 10:00:00 UTC" (representing Coordinated Universal Time (UTC) 10:00:00 on Jan. 1, 2014) and showing a vehicle registration plate, and if considering that the first resolution of the first video frame 1223 is not high enough to clearly recognize the vehicle registration plate, the processing module 104 will select the second video frame 1243 of the second video stream 124, having a timestamp the same as the timestamp of "2014 Jan. 1 T 10:00:00 UTC". Upon obtaining the second video frame 1243, the processing module 104 determines whether the vehicle registration plate shown in the second video frame 1243 is clear to be recognized, so as to determine to perform the image analysis to the image of the vehicle registration plate. The disclosure will not be limited to this example. In another example, if the first video frames 1221, 1222 and 1223 to 122$i$ are asynchronous to the second video frames 1241, 1242 and 1243 to 124$n$ respectively, the timestamps of the first video frames 1221, 1222 and 1223 to 122$i$ are respectively different from those of the second video frames 1241, 1242 and 1243 to 124$n$. In this case, the processing module 104 can use the interpolation method to search for the second video frame having a timestamp corresponding to one of the timestamps of the first video frames 1221, 1222 and 1223 to 122$i$. The interpolation method herein can be any possible interpolation method in the art and thus, will not be described hereinafter.

Furthermore, the processing module 104 can perform the image analysis to the image of the object 14 at a corresponding location in the second video frame 1243 according to the location of the image of the object 14 in the selected first video frame 1223, whereby the processing module 104 may perform the image analysis to the image of the object 14 more efficiently. For example, the processing module 104 finds out that the first video frame 1223 having the timestamp of "2014 Jan. 1 T 10:00:00 UTC" has the image of the vehicle registration plate that is at the bottom left side of the first video frame 1223. When the processing module 104 considers that the first resolution of the first video frame 1223 can not let the vehicle registration plate be recognized clearly, the processing module 104 not only searches for the second video frame 1243 having a timestamp the same as that of the first video frame 1223 but also performs the image analysis to the image of the vehicle registration plate at the bottom left side of the second video frame 1243 corresponding to the location of the image of the vehicle registration plate in the first video frame, thereby speeding up the recognition of the vehicle registration plate.

Figure 6:
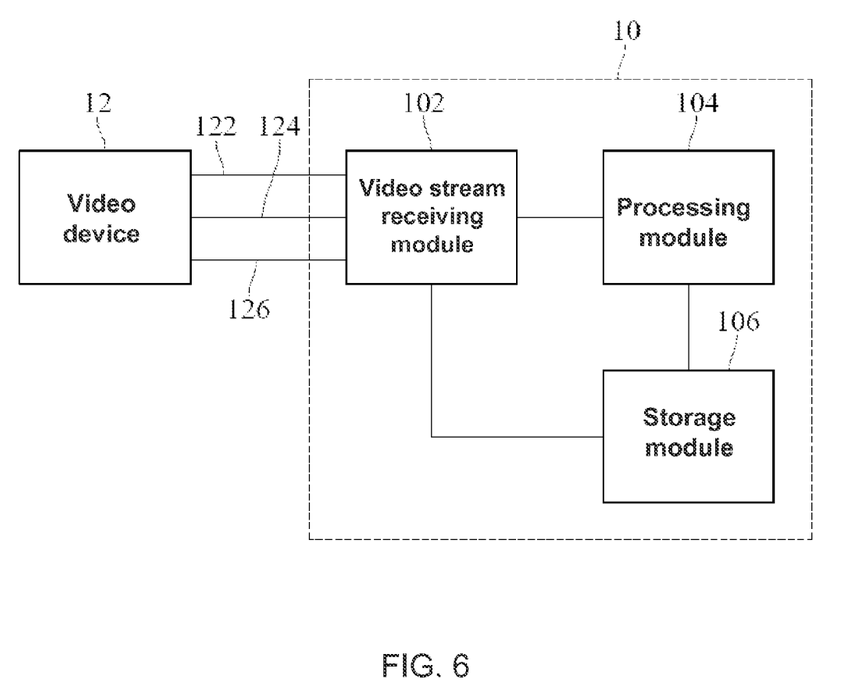
FIG. 6 is a functional block diagram of an image analysis device according to another embodiment of the disclosure.

The disclosure will have no limitation on the timing of receiving the first video stream 122 and the second video stream 124. In the above one or more embodiment, the first video stream 122 and the second video stream 124 can be received by the video stream receiving module 102 at different time. In one or more other embodiments, the first video stream 122 and the second video stream 124 having a resolution different from that of the first video stream 122 can be loaded by the video stream receiving module 102 at the same time, as shown in FIGS. 1, 4 and 6. FIG. 6 is a functional block diagram of an image analysis device according to another embodiment of the disclosure.

As shown in FIGS. 1 to 6, the video stream receiving module 102 may simultaneously receive more than one video stream, e.g. three video streams 122, 124 and 126 whose resolutions are different from each other. When the processing module 104 considers that the image of the object 14 in the first video stream 122 does not match the preset condition for the first video stream 122, the processing module 104 further determines whether the image of the object 14 in the second video stream 124 matches another preset condition for the second video stream 124. When the processing module 104 also considers that the object 14 shown in the second video stream 124 is not clear enough to be recognized, the video stream receiving module 102 proceeds to decompress the third video stream 126 to obtain third video frames and sends the third video frames to the processing module 104. The processing module 104 then determines whether the image of the object 14 in the third video frame matches the preset condition for the third video stream 126. The determination of the other video streams can be deduced by analogy, but the disclosure will not be limited thereto.

The storage module 106 is coupled with the processing module 104 and the video stream receiving module 102 and pre-stores at least the first video stream 122 and the second video stream 124. In an embodiment, the video stream receiving module 102 sends the first video stream 122 and the second video stream 124 to the processing module 104, and the processing module 104 stores these video streams in the storage module 106. In another embodiment, the video stream receiving module 102 directly stores these video streams in the storage module 106 in response to the instruction provided by the processing module 104 before sending the processing module 104 these video streams.

If a user intends to survey some information about the object 14, the processing module 104 commands the storage module 106 to send the first video stream 122 of a lower resolution to the video stream receiving module 102. The video stream receiving module 102 decompresses the first video stream 122 to obtain first video frames and sends these first video frames to the processing module 104 for the image analysis. For example, the storage module 106 is a hard disk (HD), a flash memory, a non-volatile memory, or any suitable storage medium, and the disclosure has no limitation on the type of the storage module 106.

The detailed operation of the image analysis device 10 is described by a following image analysis method, as shown in FIGS. 1, 2, 3 and 7, and FIG. 7 is a flow chart of an image analysis method according to an embodiment of the disclosure. In step S700, the video stream receiving module 102 loads the first video stream 122. In step S702, the processing module 104 recognizes the object 14 shown in the first video stream 122. In step S704, the processing module 104 selects one of the first video frames 1221, 1222 and 1223 to 122*i* of the first video stream 122, such as the first video frame 1223. In step S706, the processing module 104 determines whether the object 14 exists in the first video frame 1223.

Figure 7:
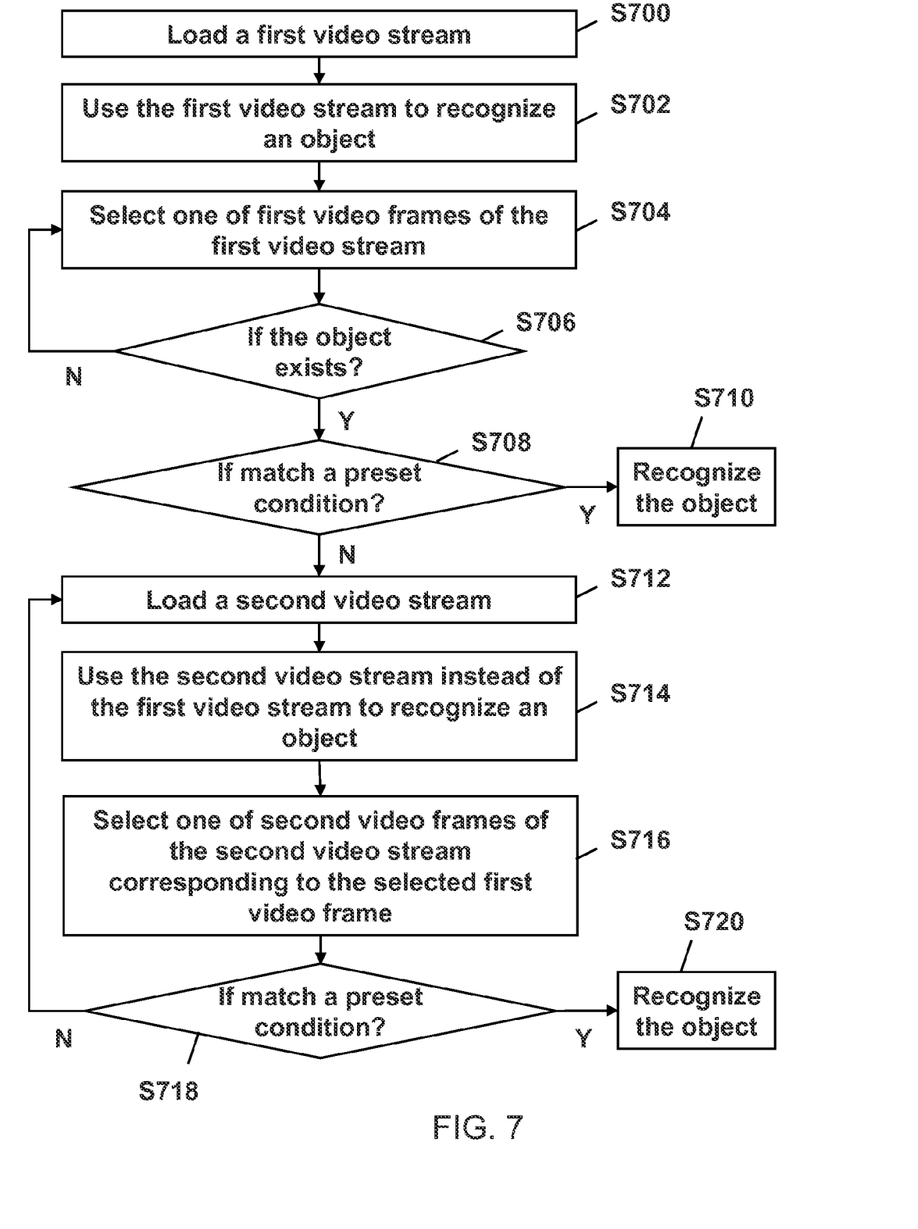
FIG. 7 is a flow chart of an image analysis method according to an embodiment of the disclosure.

When the first video frame 1223 does not show the object 14 in step S706, the image analysis method repeats steps S704 and S706 until the selected first video frame which the object 14 exists in is found out. In step S708, when the object 14 exists in the first video frame 1223 in step S706, the processing module 104 further determines whether the image of the object 14 matches a preset condition for the first video stream 120.

When the image of the object 14 in the first video frame 1223 matches the preset condition in step S708, the processing module 104 recognizes the object 14 shown in the first video frame 1223, as shown in step S710. In step S712, when the image of the object 14 in the first video frame 1223 does not match the preset condition, the video stream receiving module 102 loads the second video stream 124 having a resolution different from that of the first video stream loaded in step S700. In an example, the loading of the second video stream 124 is shown in FIG. 4.

In step S714, the processing module 104 recognizes the object 14 shown in the second video stream 124 instead of the first video stream 122. In step S716, the processing module 104 selects the second video frame 1243 having a timestamp corresponding to a timestamp of the first video frame 1223, as shown in FIG. 5. In step S718, the processing module 104 determines whether the image of the object 14 in the second video frame 1243 matches a preset condition for the second stream 124. In step S720, when the image of the object 14 in the second video frame 1243 matches the preset condition, the processing module 104 recognizes the object 14. When the image of the object 14 in the second video frame 1243 does not match the preset condition in step S718, the image analysis method returns to step S712 to load another video stream having a resolution different from the first and second resolutions, for the recognition of the object 14.

In addition, the disclosure provides a computer-readable media that commands the processing module 104 to execute a computer program including instructions. The operation of these instructions is described by the aforementioned one or more embodiments related to the image analysis device 10 and the image analysis method and thus, will not be repeated hereinafter.

In an exemplary embodiment referring to FIGS. 1 to 6, after the video device 12 (e.g. an IP camera) is installed or powered up, the video device 12 captures the images of scene to produce different video frames having different resolutions and then compresses these video frames into various video streams. To analyze the image of the object 14, e.g. the image of a certain vehicle, in the one or more video frames (for instance, to check whether the certain vehicle is a sedan), the video stream receiving module 102 receives the first video stream 122 having a low resolution of 320×240 pixels and decompresses the first video stream 122 to obtain the first video frames 1221, 1222 and 1223 to 122*i*.

After the first video stream 122 is decompressed to obtain the first video frames 1221, 1222 and 1223 to 122*i*, the video stream receiving module 102 sends the first video frames 1221, 1222 and 1223 to 122*i* to the processing module 104 such that the processing module 104 will determine which first video frame shows the certain vehicle. If the processing module finds out the first video frame 1223 showing the certain vehicle in, the processing module further determines whether the area of the image of the certain vehicle under the resolution of 320×240 pixels is larger than a threshold S1.

When the area of the image of the certain vehicle under the resolution of 320×240 pixels is smaller than the threshold S1 but the difference between the area of the image of the certain vehicle and the threshold S1 is not much, the processing module 104 sends an instruction for loading a video stream having a middle resolution to the video stream receiving module 102. In response to the instruction, the video stream receiving module 102 loads the second video stream 124 having the middle resolution of 640×480 pixels, and decompresses and extracts the second video frame 1243 of the second video stream 124 of the middle resolution, and the second video frame 1243 has a timestamp the same as or similar to a timestamp of the first video frame 1223 of the resolution of 320×240 pixels and includes an image of the certain vehicle at a location corresponding to the location of the image of the certain vehicle in the first video frame 1223. In this way, the processing module 104 may recognize the certain vehicle more efficiently.

Upon the decompression and extraction of the second video frame 1243 the processing module 104 determines whether the area of the image of the certain vehicle under the middle resolution is larger than or equal to a threshold S2. If yes, the processing module 104 recognizes the certain vehicle to check whether the certain vehicle is a sedan.

In the disclosure, the video stream receiving module one by one or simultaneously loads video streams whose resolutions are varied, the processing module selects one video stream of a low resolution to determine which video frame (referred to as a first video frame) in the video stream of the low resolution an object exists in and whether the object can be recognized clearly under the low resolution, so that the image analysis device may recognize the object under an appropriate resolution and perform the object recognition more efficiently. Moreover, the disclosure can decompress a part of one video stream having a resolution different from the low resolution to obtain one video frame (referred to as a second video frame). The timestamp of the second video frame is the same as or corresponds to the timestamp of the first video frame and has the image of the object at a location that is the same as or corresponds to the location of the image of the object in the first video frame. In this way, the image analysis device may spend less time in decompressing the video stream having a high resolution, and more efficiently obtain a clear video frame showing an object that a user intends to search for.

What is claimed is:

1. An image analysis method, comprising:
   (a) loading a first video stream having a first resolution;
   (b) selecting one of first video frames of the first video stream;
   (c) determining whether an object exists in the selected first video frame;
   (d) when the object exists in the selected first video frame, determining whether an image of the object in the selected first video frame matches a preset condition;
   (e) when the image of the object matches the preset condition, performing image analysis to the image of the object in the selected first video frame; and
   (f) when the image of the object in the selected first video frame does not match the preset condition, loading a second video stream that has a second resolution that is higher than the first resolution, selecting at least one of second video frames of the second video stream which the object exists in, and performing the image analysis to an image of the object in the at least one selected second video frame.

2. The image analysis method according to claim 1, wherein the preset condition is that an area of the image of the object in the selected first video frame is larger than a threshold.

3. The image analysis method according to claim 2, wherein the second resolution of the second video stream corresponds to a difference between the area of the image of the object and the threshold.

4. The image analysis method according to claim 1, wherein in the step (f), the selected second video frame has a timestamp corresponding to a timestamp of the selected first video frame.

5. The image analysis method according to claim 4, wherein the image analysis is performed to the image of the object at a location in the selected second video frame according to a location of the image of the object in the selected first video frame.

6. The image analysis method according to claim 1, further comprising:
pre-storing the first video stream and the second video stream in a memory in advance.

7. An image analysis device, comprising:
a video stream receiver for loading a first video stream having a first resolution; and
an analysis processor coupled with the video stream receiver, for selecting one of first video frames of the first video stream and determining whether an object exists in the selected first video frame;
wherein when the object exists in the selected first video frame, the analysis processor determines whether an image of the object in the selected first video frame matches a preset condition, when the image of the object in the selected first video frame matches the preset condition, the analysis processor performs image analysis to the image of the object in the selected first video frame, and when the image of the object in the selected first video frame does not match the preset condition, the video stream receiver loads a second video stream having a second resolution larger than the first resolution and the analysis processor selects at least one of second video frames of the second video stream which the object exists in, and performs the image analysis to an image of the object in the at least one selected second video frame.

8. The image analysis device according to claim 7, wherein the preset condition is that an area of the image of the object in the selected first video frame is larger than a threshold.

9. The image analysis device according to claim 8, wherein the analysis processor selects the second video stream having the second resolution corresponding to a difference between the area of the image of the object in the selected first video frame and the threshold.

10. The image analysis device according to claim 7, wherein the analysis processor selects one of the second video frames of the second video stream which has a timestamp corresponding to a timestamp of the selected first video frame.

11. The image analysis device according to claim 10, wherein the analysis processor performs the image analysis to the image of the object of the selected second video frame at a location corresponding to a location of the image of the object in the selected first video frame.

12. The image analysis device according to claim 7, further comprising:
a memory coupled with the analysis processor and the video stream receiver, for pre-storing the first video stream and the second video stream.

13. A non-transitory computer-readable media comprises a computer program for controlling an analysis processor to execute a plurality of instructions, the plurality of instructions comprising:
(a) loading a first video stream having a first resolution;
(b) selecting one of first video frames of the first video stream;
(c) determining whether an object exists in the selected first video frame;
(d) when the object exists in the selected first video frame, determining whether an image of the object in the selected first video frame matches a preset condition;
(e) when the image of the object matches the preset condition, performing image analysis to the image of the object in the selected first video frame; and
(f) when the image of the object in the selected first video frame does not match the preset condition, loading a second video stream that has a second resolution that is higher than the first resolution, selecting at least one of second video frames of the second video stream which the object exists in, and performing the image analysis to an image of the object in the at least one selected second video frame.

14. The non-transitory computer-readable media according to claim 13, wherein the preset condition is that an area of the image of the object in the selected first video frame is larger than a threshold.

15. The non-transitory computer-readable media according to claim 14, wherein the second resolution of the second video stream corresponds to a difference between the area of the image of the object and the threshold.

16. The non-transitory computer-readable media according to claim 13, wherein in the step (f), the selected second video frame has a timestamp corresponding to a timestamp of the selected first video frame.

17. The non-transitory computer-readable media according to claim 16, wherein the image analysis is performed to the image of the object at a location in the selected second video frame according to a location of the image of the object in the selected first video frame.

18. The non-transitory computer-readable media according to claim 13, further comprising:
storing the first video stream and the second video stream in a memory in advance.

* * * * *